(12) United States Patent
Ma et al.

(10) Patent No.: US 10,459,767 B2
(45) Date of Patent: *Oct. 29, 2019

(54) PERFORMING DATA ANALYTICS UTILIZING A USER CONFIGURABLE GROUP OF REUSABLE MODULES

(71) Applicant: International Business Machines Corporation, Armonk, NY (US)

(72) Inventors: Jihong Ma, Olathe, KS (US); Shivakumar Vaithyanathan, San Jose, CA (US); Haojun Wang, San Jose, CA (US); Tian Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 209 days.

This patent is subject to a terminal disclaimer.

(21) Appl. No.: 14/197,890

(22) Filed: Mar. 5, 2014

(65) Prior Publication Data
US 2015/0254322 A1  Sep. 10, 2015

(51) Int. Cl.
*G06F 9/50* (2006.01)
*G06F 16/182* (2019.01)

(52) U.S. Cl.
CPC .......... *G06F 9/5066* (2013.01); *G06F 16/182* (2019.01)

(58) Field of Classification Search
CPC . G06F 17/30224; G06F 9/5066; G06F 16/183
See application file for complete search history.

(56) References Cited

U.S. PATENT DOCUMENTS

| | | | |
|---|---|---|---|
| 7,966,340 B2 | 6/2011 | Friedman et al. | |
| 8,066,194 B2* | 11/2011 | McCall | G06F 17/3056 706/47 |
| 8,484,279 B1* | 7/2013 | Cole | G06F 9/5044 709/201 |
| 9,170,848 B1* | 10/2015 | Goldman | G06F 16/2365 |
| 9,230,211 B1* | 1/2016 | Basu | G06Q 10/063 |
| 2005/0131941 A1* | 6/2005 | Dettinger | G06F 16/20 707/999.104 |
| 2011/0124406 A1* | 5/2011 | Blackburn | G07F 17/323 463/25 |
| 2012/0110047 A1 | 5/2012 | Hildrum et al. | |
| 2012/0317579 A1* | 12/2012 | Liu | G06F 11/1438 718/104 |
| 2013/0151453 A1* | 6/2013 | Bhanot | G06Q 10/06375 706/46 |

(Continued)

*Primary Examiner* — Ashish Thomas
*Assistant Examiner* — Jedidiah P Ferrer
(74) *Attorney, Agent, or Firm* — Susan Murray; SVL IPLaw Edell, Shapiro & Finnan, LLC (57) ABSTRACT

According to one embodiment of the present invention, a computer-implemented method of performing analytics on a large quantity of data accommodated by an external mass storage device is provided. The analytics may be divided into a set of modules, wherein each module is selectively executed and comprises a script for a parallel processing engine to perform a corresponding atomic operation on the analytics. A user selection is received of one or more modules to perform desired analytics on the large quantity of data from the external mass storage device, and the selected modules execute scripts for the parallel processing engine to perform the corresponding atomic operations of the desired analytics.

9 Claims, 5 Drawing Sheets

(56) References Cited

U.S. PATENT DOCUMENTS

| | | | |
|---|---|---|---|
| 2013/0166568 A1 | 6/2013 | Binkert et al. | |
| 2013/0218759 A1* | 8/2013 | Anthony | G06Q 20/22 705/39 |
| 2013/0227577 A1 | 8/2013 | Patanella | |
| 2013/0317803 A1* | 11/2013 | Manley | G06F 17/5009 703/21 |
| 2013/0318277 A1 | 11/2013 | Dalal et al. | |
| 2014/0006383 A1* | 1/2014 | Hacigumus | G06F 16/24534 707/718 |
| 2014/0012877 A1* | 1/2014 | Krishnamurthy | G06F 17/30516 707/771 |
| 2014/0032528 A1 | 1/2014 | Mandre et al. | |
| 2014/0136779 A1* | 5/2014 | Guha | G06F 17/30194 711/114 |
| 2014/0215487 A1* | 7/2014 | Cherkasova | G06F 9/5083 718/106 |
| 2014/0324839 A1* | 10/2014 | Sayers | G06F 9/44536 707/723 |
| 2014/0372438 A1* | 12/2014 | Chandramouli | G06F 16/285 707/737 |
| 2014/0379632 A1* | 12/2014 | Gera | G06Q 10/00 707/608 |
| 2015/0006716 A1* | 1/2015 | Suchter | G06F 9/5038 709/224 |
| 2015/0200867 A1* | 7/2015 | Dutta | H04L 47/70 709/226 |

\* cited by examiner

PERFORMING DATA ANALYTICS UTILIZING A USER CONFIGURABLE GROUP OF REUSABLE MODULES

BACKGROUND

1. Technical Field

Present invention embodiments relate to data analysis, and more specifically, to the efficient generation of data analytics in distributed file systems.

2. Discussion of the Related Art

Distributed file systems and clustered file systems have been developed in part to address the challenges posed by big data. Distributed file systems are typically shared across multiple servers in a cluster that often operate in parallel to dramatically increase processing speed and data throughput, all while maintaining the appearance of local file systems to the client. The term "big data" generally refers to data sets with a quantity of data so large that traditional enterprise (such as in-memory) database management and file system solutions cannot store them and/or process them efficiently or quickly. Many technologies, including Internet searching, genomics, market data and social media solutions are also subject to big data issues.

BRIEF SUMMARY

According to one embodiment of the present invention, a computer-implemented method of performing analytics on a large quantity of data accommodated by an external mass storage device is provided. The analytics may be divided into a set of modules, wherein each module is selectively executed and comprises a script for a parallel processing engine to perform a corresponding atomic operation on the analytics. A user selection is received of one or more modules to perform desired analytics on the large quantity of data from the external mass storage device, and the selected modules execute scripts for the parallel processing engine to perform the corresponding atomic operations of the desired analytics.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments may perform big data analytics in a distributed file system using analytics modules. Partial solutions may be generated after each analytics module, validated, and used and reused as the input for one or more subsequent analytics modules. Each analytics module may be divided into atomic operations, such as map and reduce operations, wherein each module may perform pre-processing steps, statistical analytics, and post-processing steps. User input may also be received which selects certain ones of the analytics modules for execution, determines analytic module orderings, and provides parameters to one or more analytics modules.

Performing data analytics on big data poses significant design and implementation challenges. Previously, enterprise solutions would feed large amounts of data into specialty hardware on a single computer with a large memory that executes very quickly. The size of the data sets involved with big data, however, are so large that enterprise (such as in-memory based) implementations are no longer feasible. Yet, most existing enterprise analytics tools are only designed for in-memory solutions. The raw data to be used in big data analytics requires pre-processing before it can be provided to the statistical models. Depending on the user scenario, different pre-processing steps may be required for each client job to prepare and cleanse the data. Further, many statistical models are available which the user may wish to apply to the same data set. For example, classification can be performed via either linear logistic regression or by a support vector machine (SVM) algorithm. Another difficult issue is determining which statistical model will generate a more accurate analytics. Finally, big data analytics involves so much data that traditional storage and processing systems are overwhelmed.

Figure 1:
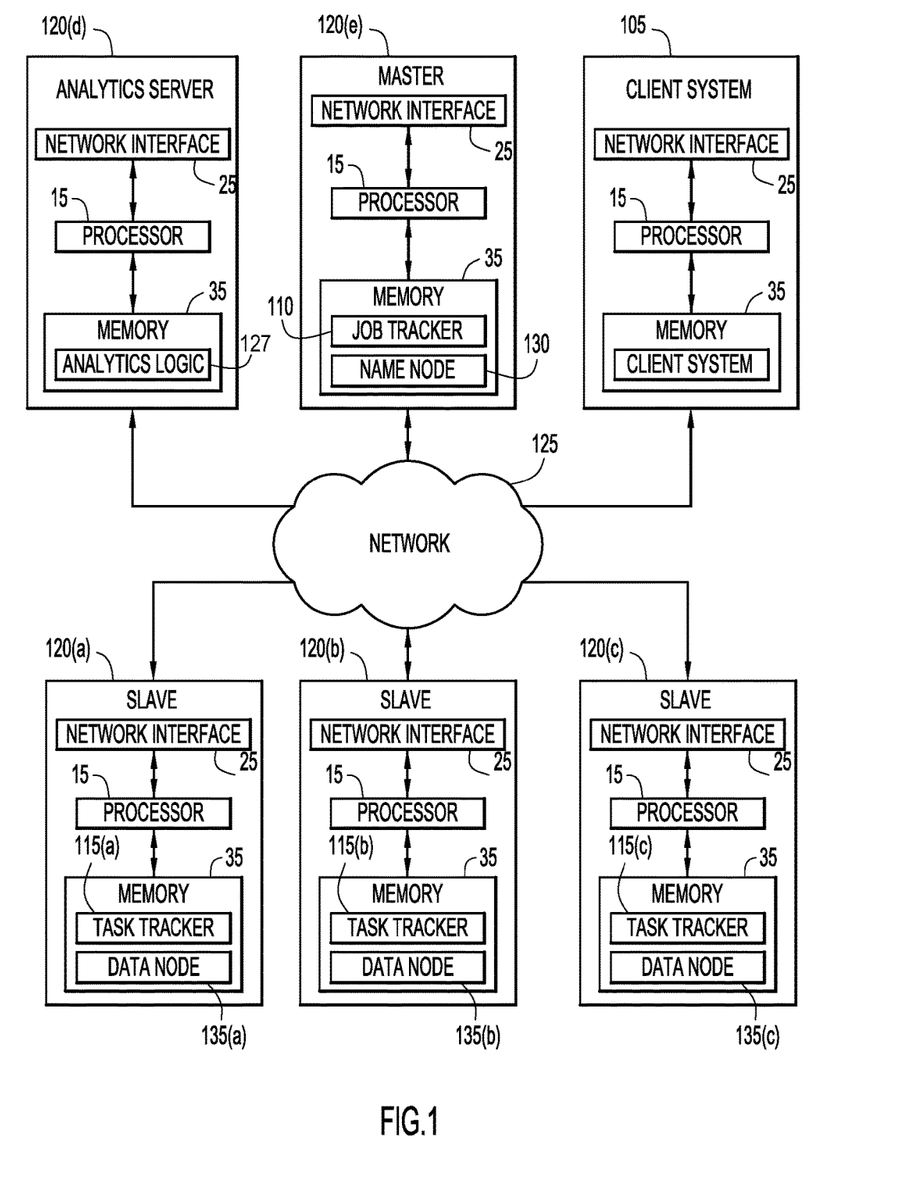
FIG. 1 is a diagrammatic illustration of an example computing environment for use with an embodiment of the present invention.

With reference now to FIG. 1, an example computing environment of a present invention embodiment shows a distributed file system allowing parallel processing in order to greatly enhance data storage and processing throughput. An embodiment is shown in which one or more client jobs from a client system 105 are provided to a job tracker 110 that distributes the client tasks to task trackers 115(*a*)-115(*c*) on multiple servers 120(*a*)-120(*c*) across the network 125 for the purpose of generating data analytics using analytics logic 27 of server 120(*d*). A name node 130 may track data distributed in data nodes 135(*a*)-135(*c*) across the network 125 associated with the client job, where each data node 135(*a*)-135(*c*) stores blocks of distributed data. Client systems 105 may enable users to submit information (e.g., data such as raw analytics data, input such as module selections, etc.) to server systems 120(*a*)-120(*e*) so that the data may be stored and data analytics processing may be initiated.

Server systems 120(*a*)-120(*e*), (and solutions thereon such as job tracker 110, analytics logic 27 and name node 130) and client system(s) 105 may be remote from each other and communicate over network 125. Solutions such as analytics logic 27, job tracker 110, name node 130, task trackers 115(*a*)-115(*c*), data nodes 135(*a*)-135(*c*), etc., may vary in number, and may be located on the same physical server or arranged in any way across multiple physical servers such as servers 120(*a*)-120(*e*), as the example shows in FIG. 1. The network may be implemented by any number of any suitable communications media (e.g., wide area network (WAN), local area network (LAN), Internet, Intranet, etc.). Network connections between data nodes 135(*a*)-135(*c*), name node 130, job tracker 110, and task trackers 115(*a*)-115(*c*) may be high speed to avoid bottlenecking. Alternatively, server systems 120(*a*)-120(*e*) and client systems 105 may be local to each other, and communicate via any appropriate local communication medium (e.g., local area network (LAN), hardwire, wireless link, Intranet, etc.).

Server systems 120(a)-120(e) and client systems 105 may be implemented by any conventional or other computer systems, and may be equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, distributed file system software, analytics generation software, map/reduce software, etc.).

Analytics logic 27 may include one or more modules or units to perform the various functions of present invention embodiments described below. The various modules may be implemented by any combination of any quantity of software and/or hardware modules or units, and may reside within memory of a physical server 120(d) and/or client systems 105 for execution by a physical processor.

The example embodiment shown in FIG. 1 may be implemented partly with a conventional Hadoop system. Hadoop is a system that distributes both processing and storage across a network. Rather than specialty hardware, commonly available and relatively inexpensive commodity hardware may be used. By using a substantial number of servers 120(a)-120(e), the processing performance may be increased such that big data processing becomes possible. While servers 120(a)-120(e), also known as nodes, are shown, any number of servers are possible to perform distributed storage and processing according to techniques of present invention embodiments presented herein. The number of servers may be scaled even to thousands, which allows both processing power and storage capacity to be increased substantially linearly. Further, the number of client systems 105, analytics logic modules 27, job trackers 110, and name nodes 130 may vary, although an implementation such as Hadoop may only have one job tracker and name node.

The distributed file system of FIG. 1, which may be based on a Hadoop Distributed File System (HDFS), may use a master/slave architecture. Incoming data, for example from a client system 105, may be split into data blocks of a predetermined size and distributed by the name node 130 (although data doesn't necessarily pass directly through the name node) to the data nodes 135(a)-135(c). Blocks may be duplicated and stored in multiple locations for redundancy and to aid in error recovery and fault tolerance. The name node 130 may track the locations of data blocks in data nodes 135(a)-135(c), each of which may be, for example, 64 megabytes in size. The name node 130 may also track the status of each of the data nodes on the servers 120(a)-120(c), which may be operational, disabled, or have a troubled status. In the event of a node failure in the cluster, the name node may take steps to create new redundant data stores, inform the job tracker of the failure, etc.

The master job tracker 110 coordinates the delegation of tasks across task trackers, and thus distributes processing across the cluster. Tasks may be delegated to task trackers 115(a)-115(c). The job tracker 110 and name node 130 may communicate with each other and coordinate activities. The job tracker may be aware of the multiple locations of each data block. As a result, typically the job tracker attempts to assign tasks to server nodes which store the data block(s) associated with the job. This radically reduces network traffic compared with other methods of distributed processing. The job tracker 110 may also monitor the health of each node in the cluster. If a server node goes down, or is otherwise experiencing technical problems, the job tracker may reassign tasks from the problematic node to another node. The full job received from the client may also be split into multiple atomic sub-tasks and distributed across the cluster. As a result, parallel computation and processing of jobs is achieved.

Figure 2:
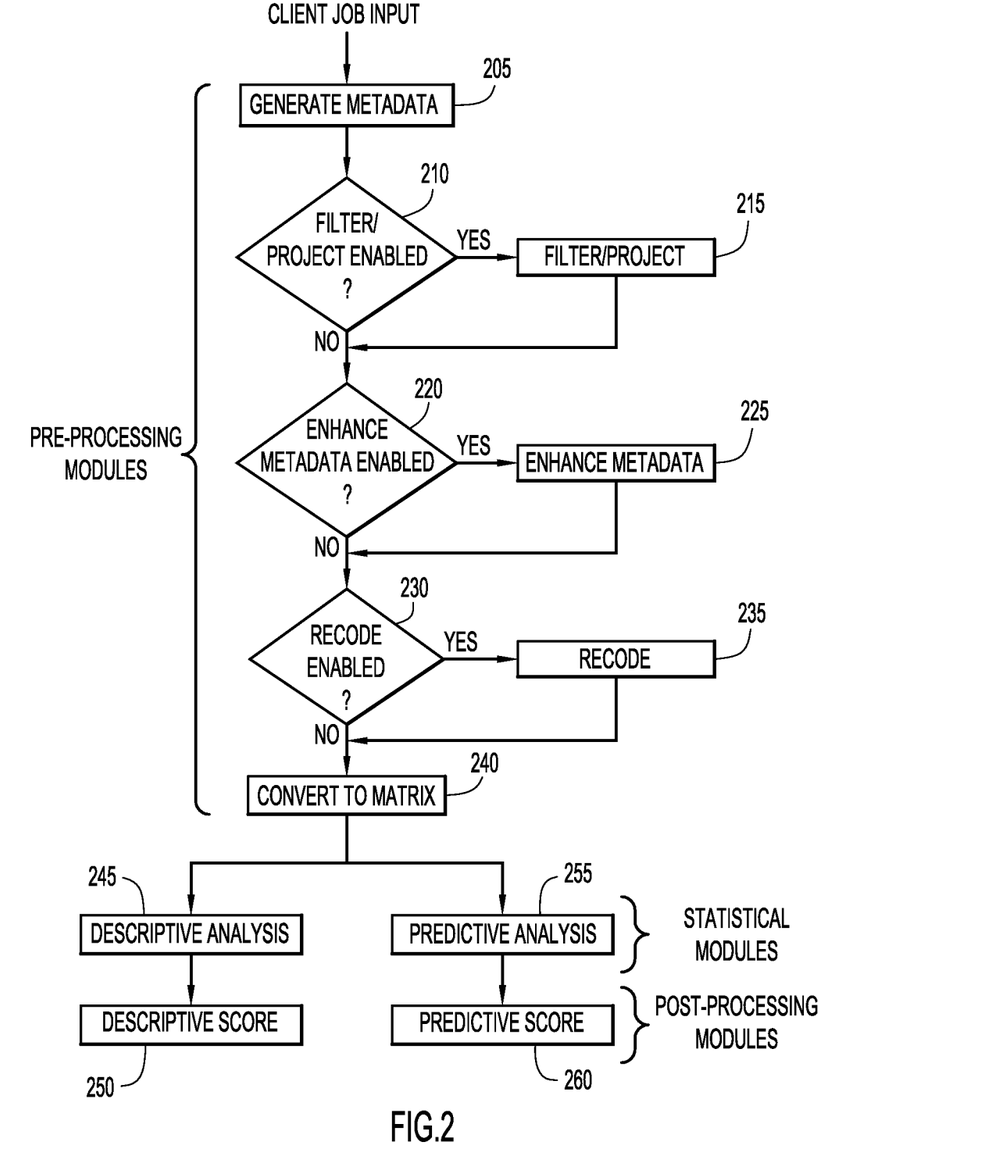
FIG. 2 is a procedural flow chart illustrating a manner in which data is processed to generate analytics according to an embodiment of the present invention.

With reference to FIG. 2, an example flow chart is shown that illustrates the performance of analytics (e.g., via analytics logic 27 and server 120(d)). As discussed above, big data processing poses formidable challenges. To achieve analytics on big data, one solution would be to perform a series of fixed steps from raw data to finish. For example, if a user wishes to perform a linear logistic regression using enhanced metadata (e.g., which specifies some columns as ordinal), a map/reduce program may be built that can do only this process. However, this approach is inflexible as there are many forms of data pre-processing and statistical approaches that the user may desire. In addition, a user may wish to apply multiple statistical models to the same pre-processed data. With the fixed approach, the same raw data would have to be pre-processed multiple times for each analytics algorithm. Since partial solutions would not be able to be re-used, computational efficiency is reduced.

In order to process big data, the example embodiment shown in FIG. 2 divides each pre-processing, statistical and post-processing step into discrete, atomic modules. From the user perspective, the modules may intuitively be assembled to create module chains that operate to perform a specific analytic task. Within each module, a series of discrete steps or atomic data operations are determined which may be used to create parallelizable map and reduce jobs, as discussed below. Since each module may be parallelized, the solution is scalable as data size and processing needs grow. Each module may be a self-contained code package or script. Source code languages may include Java, JavaScript Object Notation Query Language (JAQL) or data manipulation language (DML), although other languages may be employed to implement the techniques of present invention embodiments presented herein.

The inputs and outputs of each module may be pre-determined and have a consistent data model/schema so that data may be reliably forwarded from one module to the next in the chain. As shown in FIG. 2, the types of modules may be divided into pre-processing modules (e.g., the functions of which are described with respect to steps 205-240), statistical modules (e.g., the functions of which are described with respect to steps 245 and 255), and post-processing modules (e.g., the functions of which are described with respect to steps 250 and 260). The statistical modules may be further divided into descriptive analysis and predictive analysis.

In FIG. 2, at step 205 a client job with a series of tasks, and possibly associated raw data, may be received. The raw data may be comma-separated values (CSV), but can be any data format. Metadata may then be generated from the raw data, which may be a required step. Alternatively the user may provide a metadata file along with the raw data. A metadata file may specify the column and row names, column and row types, and other information about the raw data. At step 210, it may be automatically determined if filter and project modules are enabled. If yes, the filter and project modules will be executed at step 215. The filter module provides the ability to selectively remove data rows. For example, the raw data may have a gender column, but the user is only interested in the data for females. The filter module removes rows (tuples) where gender=female. Projection occurs if there are multiple columns of data, but the user is only interested in a subset of the columns (attributes).

The desired columns may be automatically projected into the solution, while the unwanted columns are automatically discarded. In this manner, irrelevant tuples and attributes can be dropped early in the process for maximum query optimization. The filter and project modules may be optional based on user input or configuration, and may require user input to designate tuples and attributes for inclusion and/or exclusion.

At step 220, it may be determined if the enhance metadata module is activated. If so, step 225 will be executed to enhance metadata. Some of the raw data may already be numerical, but some data may need to be converted to numbers in order to receive statistical processing. Some data may be nominal, which is data that does not inherently correspond to any numerical value. For example, a gender field may include values of male or female. These data values may be converted to female=1 and male=2 for data processing purposes. In contrast with nominal data, ordinal data typically lends itself to ordered numbering. Non-dichotomous ordinal data may be, for example, data which consists entirely of answers like "dislike," "somewhat like," and "like very much." Dichotomous ordinal data may be, for example, "healthy" and "sick." As an example, numerical values may be set such that "dislike"=1, "somewhat like"=2, and "like very much"=3, etc. The system does not necessarily know which data values correspond to which numerical value, so the user may be asked to order the possible data values. The enhance metadata module performs the data enhancement and may be optional.

At step 230, it may be determined if the recode module is activated. The recode module may convert strings or categorical columns in the raw data into the numerical values as determined in the enhance metadata step 225. The analytics logic 27 may automatically assign numerical values for nominal data, although the user may be automatically prompted to provide numbers for ordinal data. Nominal and ordinal status may be automatically determined simply by the number of data variations in the data set, as nominal fields typically only have a few possible values. The recode module may be optional, although it is typically required if the enhance metadata module is enabled. Similarly, while the enhance metadata module may be optional, it is typically required if the recode module is enabled.

At step 240, the convert to matrix module may be executed. This step may convert the raw data using the metadata into a sparse matrix format, although other forms of matrix and other pre-processing finalization techniques may be employed by present invention embodiments presented herein. The sparse matrix format may be preferred for big data sets because large volumes of statistical data typically contain a large number of zeroes. The sparse data format does not store a value for zero, and thus the sparse matrix format provides a highly efficient storage technique. The convert to matrix module 240 may be required.

At steps 245 and/or 255, any number of statistical analyses including descriptive analyses and predictive analyses may be performed on the processed data by statistical modules. Descriptive analyses are data analytics techniques which describe the data that has been collected. They include univariate statistics and bivariate statistics, for example. Predictive analyses are data analytics which use current and historical data to make predictions about future, unknown events. These include, for example, linear regression, support vector machine (SVM), linear logistic regression (LLR), etc.

Finally, at steps 250 and/or 260 descriptive score or predictive score post-processing may be applied by post-processing modules. In the case of univariate statistics, a univariate decode algorithm may be applied. A bivariate decode may be applied in the case of a bivariate statistics descriptive algorithm. As for predictive algorithms, a linear regression score algorithm may be automatically performed, suggested or required for execution if a linear regression is performed. Similarly, a support vector machine (SVM) score algorithm may be automatically performed, suggested or required for an SVM module, and a linear logistic regression (LLR) score module may be automatically performed, suggested or required for an LLR algorithm. Other post-processing techniques may be employed by present invention embodiments presented herein. Each post-processing module may be automatically performed, suggested or required for execution.

The results of the scoring modules may be used to determine if alternative statistical modules should be automatically executed with the partial result preprocessed data as input. For example, one predictive analysis may score poorly, so another would be chosen and executed automatically, or suggested to the user for execution. Correlations in the post-processing data may also be used to suggest or automatically execute statistical modules. For example, if the results of a bivariate decode shows that two columns have high correlations, then these two columns may be fed into a linear regression predictive analysis.

As discussed previously, modules may have defined inputs and outputs. The user may choose to activate any number of the pre-processing, statistical and post-processing modules, and may choose the order. The selected order of modules may be automatically tracked to identify any compatibility problems. For example, two modules may be determined to be or defined as incompatible with each other. As another example, the system may allow only one statistical module to be performed per module chain. Certain module chains and sub-chains may also be recommended. For example, as mentioned previously, the LLR score module may be suggested for the LLR algorithm. Automatic module suggestions may also occur after the analytics logic 27 scans the data. For example, the enhance metadata module may be suggested if there are rows and columns which do not contain numerical data.

Certain module orderings may also be enforced. For example, statistical modules may be required to come after pre-processing modules and before post-processing modules. The filter/project module may be required to come before the enhance metadata module, etc. Some modules may be required, such as the convert to matrix module. In the example shown in FIG. 3, the generate metadata and convert to matrix steps may be the minimum pre-processing modules to be executed.

By using these techniques, several advantages can be realized. First, since each module is a discrete, atomic set of actions executed on the raw data set, the results may be verified at each step as an incremental processing model. Second, it is relatively simple and flexible for the user to choose a different set of modules to perform a specific task. For example, the user may use the generate metadata and convert to sparse matrix modules to accomplish data transformation work if the data is already recoded. Or the user can use the generate metadata, filter/project and convert to sparse matrix if the user wishes to prune some data on a recoded data set. Partial solutions after a given step in the module chain may be reused with differing subsequent chains of modules. For example, a partial solution of metadata with filter and project pre-processing in one chain may be used with metadata enhancement and recoding, but this partial solution may be reused with another module chain which does not provide for metadata enhancement and recoding. Thus, one or more partial solutions may be used to avoid re-execution of a corresponding selected module in another associated module chain.

Third, once the data analytics process is stabilized, the user can create an application chain in a user application so the module chain can be submitted as a batch. Fourth, in the future, additional modules may be added to provide more features and analytics modules based on changing user requirements. The module design with an underlying distributed storage and processing system also hides complexity from the user, leaving the user to focus on the module chain, rather than low-level details. The modules are thus independent, potentially re-orderable and reusable, and may be executed as a pipeline (batch) given the user scenario and system requirements.

Figure 3:
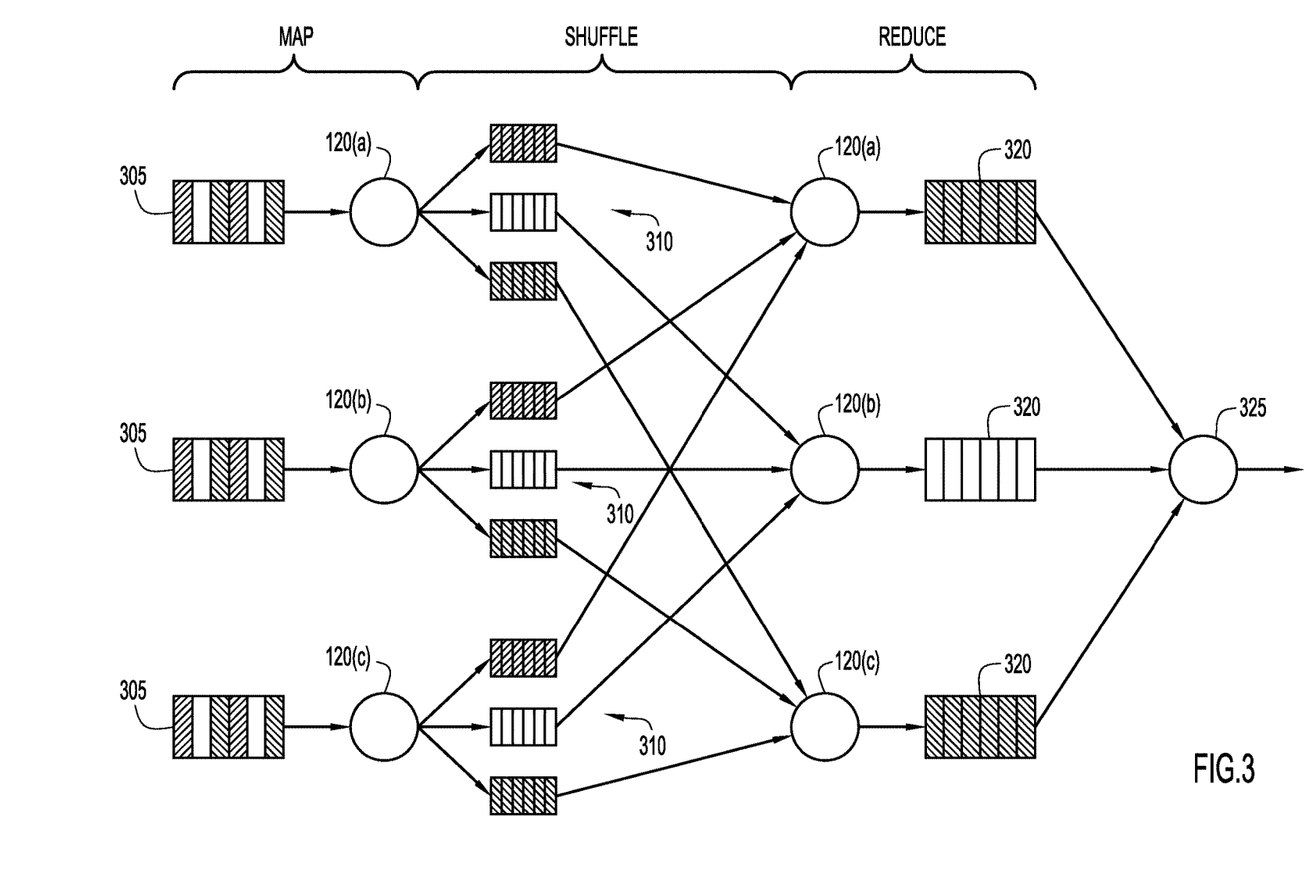
FIG. 3 is a flow diagram illustrating a manner in which analytics modules are processed using map and reduce steps according to an embodiment of the present invention.

Turning to FIG. 3, a flow diagram is shown depicting the division of a module into map and reduce jobs. Map and reduce steps may be scheduled by the job tracker 110 over task trackers 115(a)-115(c), with a module being broken down into atomic steps, as discussed previously. The map and reduce programs typically operate in three stages: map, shuffle and reduce. The map step performs transformations on input key-value pairs 305 to produce output key value pairs on nodes 120(a)-120(c). The shuffle step moves the output key-value pairs to the appropriate nodes 120(a)-120(c) where they will be reduced, and the reduce step takes the output key-value pairs and identified duplicates to produce a reduced set of key-value pairs 320 on the output node 325.

As an example of an algorithm broken into map and reduce steps, map/reduce may be used to identify the number of letters in each word of an input string. The input string may be, for example, the text of a large number of books. In the map step, the individual words found in the books would be mapped to the number of letters in each word to form key-value pairs. For example, 3=the, 3=you, 3=and, 4=then, 4=what, etc. These might be grouped as 3=[the, you, and], and 4=[then, what] on each node performing the task. A number of nodes 120(a)-120(c) in the cluster may perform these computations in parallel, since these operations are stateless, each producing their own partial answer which will be sorted at 310 and sent to the appropriate node in the shuffle stage. For example, if one node 120(a) is assigned the task of collecting all data related to the number of words with 3 letters, all other nodes in the cluster will forward their partial solutions to node 120(a) during the shuffle stage. Each line, for example 3=[the, you, and], may be passed as an argument to the reduce function, which accepts a list of key-value pairs. In the reduce stage, the words may be recoded as a number, for example 3=[the, you, and] is converted to 3:3 at 320. These reductions may be performed in parallel, providing a powerful efficiency advantage. The partial results may then be accumulated at a node in the cluster 325.

The shuffle and reduce steps may not be relevant to a particular task in question. For example, a simple file conversion may not have any reduce step. Conversely, complex computations may require multiple map and reduce steps. As an example, a generate metadata module may be used that wraps a JAQL script. The script may first accept a CSV file as input, as well as an input header and input delimiter, all of which may be provided by a user via a user interface. The input header parameter may indicate whether the CSV file has a header line, while the delimiter parameter indicates whether fields in the raw data are delimited by commas, tabs, etc. The raw data may be read line by line, splitting the first line to obtain the number and names of columns. Alternatively, the column names may be obtained from the input header. Using a line of data after the first line, the data types of each column may be guessed using regular expression testing. The determined columns names and data types may also be output to the metadata file.

The JAQL script may be pre-defined by the developer or user. Based on the content of the script and parameter values, the JAQL engine may compile and optimize the execution of the script. In this example, the JAQL engine may generate only one map job: reading the first line of the CSV file as the column names, reading the second line of the CSV file to guess the data type, and then outputting the column names and types to the metadata file. As the JAQL script becomes more complex with other modules, the user would only need to create a valid script, as the JAQL engine will spawn map/reduce jobs and optimize the map/reduce execution in a manner which is transparent to the user.

Figure 4:
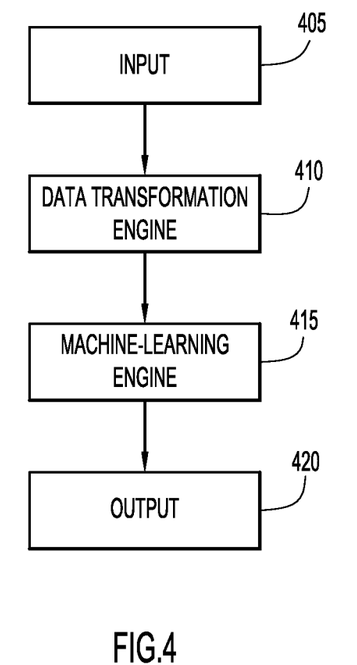
FIG. 4 is a procedural flow chart illustrating engines used in the generation of data analytics according to an embodiment of the present invention.

FIG. 4 is a flow chart illustrating example engines used in the generation of data analytics. At step 405 module selections and/or raw data may be input. As the user or administrator selects modules to be executed in a module chain, a master script may be automatically generated by, for example, a distributed storage management solution. The master script may be a JAQL script, although other programming languages may be employed by present invention embodiments presented herein. The master script designates the ordering of modules in a chain, as well as which modules will be present in the chain. The system may also validate the module chain, checking for required modules and potential module ordering problems, etc., as discussed previously.

The master script may be passed into a data transformation engine at step 410. The data transformation engine may be, for example, a JAQL engine which accepts stand-alone scripts for the individual modules in DML to execute data transformation logics, although other engines and script languages may be employed by present invention embodiments presented herein.

Once any pre-processing scripts, for example scripts associated with steps 205-240 in FIG. 2, have been executed, perhaps by a JAQL engine on a Hadoop cluster, the data transformation is complete and execution flow moves to the machine learning engine at step 415. The machine learning engine attempts to gain additional data analysis capacities based upon prior data analysis experiences. Especially in regards to predictive analytics, which attempts to analyze historical facts to make predictions about future events, machine learning can aid in increasing the accuracy of analytics modules. At step 415, the machine learning (ML) engine accepts the partial result, such as the sparse matrix produced in the pre-processing steps. The ML engine may be based upon SystemML, a Hadoop-based declarative machine learning engine, although other machine-learning engines would be consistent with techniques presented herein. The ML engine takes scripts for statistical modules, for example those associated with steps 245 and 255 from FIG. 2, and automatically breaks them down into map/reduce jobs. For example, an analytics module may wrap a DML script to perform a matrix transpose followed by a matrix multiplication. First the DML script may read in two files, which may be indicated by a user. The script may compute a transpose of the first file, then multiple by values in the second file, and then output the result to a user-indicated file. The SystemML engine's compiler and optimizer may decide that two map/reduce jobs are required: first to read the first file and transpose it, and the second is to multiple the transposed first file and the second file. As the script gets more complex, SystemML is able to optimize the execution of map/reduce jobs. The user, however, only needs to ensure that the DML script is logically valid and sound. The underlying map/reduce job creation and execution may thus be transparent. Each statistical module may be expressed in DML a declarative high-level language that significantly improves the productivity for implementing machine learning algorithms. DML exposes several constructs including linear algebra primitives that constitute key building blocks for a broad class of supervised and unsupervised machine learning algorithms. DML also incorporates machine learning constructs such as cross-validation. Finally, post-processing modules, such as those associated with steps 250 and 260 from FIG. 2, may also be applied.

The ML engine may implement optimization techniques to generate low-level execution plans for map/reduce. The optimizations are based on data and system characteristics.

The scripts for each module may be automatically converted to map and reduce steps as discussed in regards to FIG. 3 above. In this manner, the master script, which the user may be able to directly edit, may focus on the high-level processing steps of the algorithm, rather than low-level map/reduce and distributed file system concerns. The division of the user script and the generation of map/reduce steps may occur in the application layer, while the map/reduce jobs may be further divided or distributed for the lower parallel processing layer across the node cluster.

Figure 5:
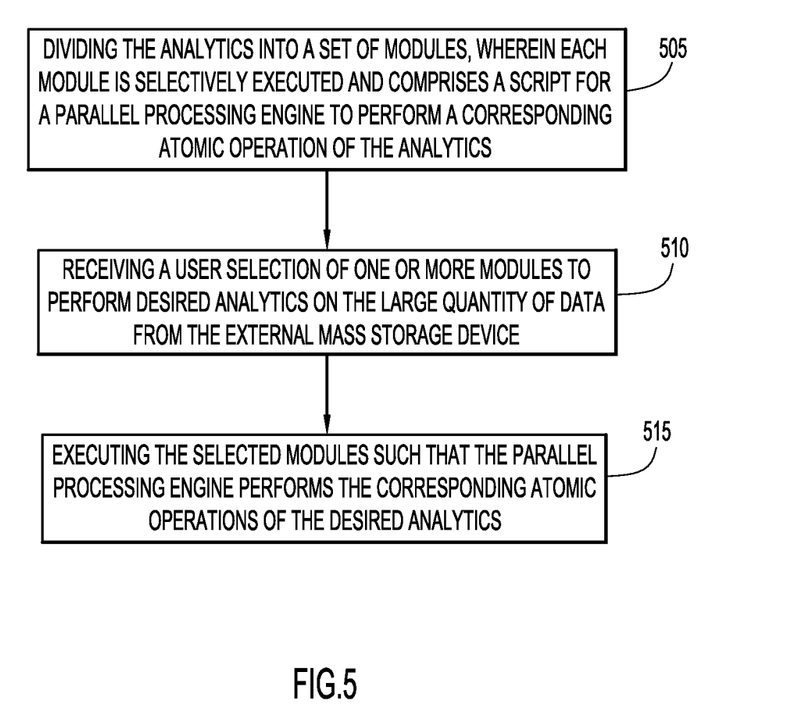
FIG. 5 is a procedural flow chart illustrating the generation of data analytics according to an embodiment of the present invention.

FIG. 5 is a flow chart illustrating the generation of data analytics according to one embodiment of the present invention. At step 505, the analytics may be divided into a set of modules, wherein each module is selectively executed and comprises a script for a parallel processing engine to perform corresponding atomic operation of the analytics. The user selection of one or more modules may be received at step 510 to perform desired analytics on the large quantity of data from the external mass storage device. At step 515, the selected modules are executed such that the parallel processing engine may perform the corresponding atomic operations of the desired analytics.

It will be appreciated that the embodiments described above and illustrated in the drawings represent only a few of the many ways of implementing embodiments for performing data analytics utilizing a user-configurable group of reusable modules.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, profile generation module, profile comparison module, etc.). These systems may include any types of monitors and input devices (e.g., keyboard, mouse, voice recognition, etc.) to enter and/or view information.

It is to be understood that the software (e.g., analytics logic, distributed file storage and processing logic, map/reduce logic, data transformation engine, machine-learning engine, etc.) of the present invention embodiments may be implemented in any desired computer language and could be developed by one of ordinary skill in the computer arts based on the functional descriptions contained in the specification and flow charts illustrated in the drawings. Further, any references herein to software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., analytics logic, distributed file storage and processing logic, map/reduce logic, data transformation engine, machine-learning engine, etc.) may be available on a non-transitory computer readable or useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, distributed file systems etc.) to store information. The database system may be implemented by any number of any conventional or other databases, data stores or storage structures (e.g., files, databases, data structures, data or other repositories, distributed file systems, etc.) to store information. The database system may be included within or coupled to the server and/or client systems. The database systems and/or storage structures may be remote from or local to the computer or other processing systems, and may store any desired data (e.g., raw data, partial solutions from modules, module scripts, map/reduce steps, etc.).

The present invention embodiments may employ any number of any type of user interface (e.g., Graphical User Interface (GUI), command-line, prompt, etc.) for obtaining or providing information (e.g., user selections of modules and module orderings, raw data), where the interface may include any information arranged in any fashion. The interface may include any number of any types of input or actuation mechanisms (e.g., buttons, icons, elements, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user (e.g., analytics, etc.).

The present invention embodiments may use other file and engine types than those described above. Further, any type of database or data store may be used and interacted with in the performance of steps described above. Using techniques similar to those presented above, many more pre-processing, analytics, and post-processing modules than those listed above may be used. The present invention embodiments are not limited to use of the specific data types described above.

The present invention embodiments are not limited to the specific tasks or algorithms described above, but may be utilized for any task requiring data pre-processing, analytics, data post-processing, etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible (non-transitory) medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more job instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for performing analytics on a large quantity of data accommodated by an external mass storage device comprising:
a computer system including at least one processor configured to:
divide the analytics into a plurality of analytic modules, wherein each of the analytic modules is selectively executed and comprises a script for a parallel processing engine to perform a corresponding atomic operation of the analytics, the plurality of analytic modules including one or more pre-processing modules, one or more statistical analytic modules and one or more post-processing modules;
receive an input from a user, the input including a user selection of one or more of the plurality of analytic modules to perform desired analytics on the large quantity of data from the external mass storage device;
responsive to the receiving the input including the user selection, automatically generate a master script designating the one or more of the plurality of analytic modules that are to be present in a module chain and an order of performing the designated one or more of the plurality analytic modules in the module chain, one or more pre-processing modules of the one or more of the plurality of analytic modules to be executed before one or more statistical analytic modules of the one or more of the plurality of analytic modules, and the one or more statistical analytic modules of the one or more of the plurality of analytic modules to be executed before one or more post-processing modules of the one or more of the plurality of analytic modules;
execute pre-processing scripts associated with the one or more pre-processing modules of the one or more of the plurality of analytic modules in the module chain to produce one or more partial solutions, the one or more pre-processing modules of the one or more of the plurality of analytic modules preparing and cleaning raw data to produce the one or more partial solutions to be provided to the one or more statistical analytic modules in the module chain;
accept one of the one or more partial solutions and automatically break down scripts associated with the one or more statistical modules of the one or more of the plurality of analytic modules in the module chain into map/reduce jobs and optimize execution of the map/reduce jobs;
execute the map/reduce jobs;
and
automatically execute alternative statistical modules, based on scoring results of the one or more post-processing modules of the one or more of the plurality of analytic modules, the automatically executing reusing, as input, a partial solution of the one or more partial solutions produced by completing execution of at least one of the one or more pre-processing modules to avoid re-execution of the at least one of the one or more pre-processing modules.

2. The system of claim 1, further comprising:
validating the one or more partial solutions.

3. The system of claim 1, wherein the atomic operations include map and reduce operations.

4. The system of claim 1, wherein the analytic modules include pre-processing steps, statistical analytic steps, and post-processing steps.

5. The system of claim 1, wherein the external mass storage device is a Hadoop Distributed File System (HDFS).

6. A computer program product for performing analytics on a large quantity of data accommodated by an external mass storage device comprising:
a non-transitory computer readable storage medium having computer readable program code embodied therewith, the computer readable program code comprising computer readable program code configured to:
divide the analytics into a plurality of analytic modules, wherein each of the analytic modules is selectively executed and comprises a script for a parallel processing engine to perform a corresponding atomic operation of the analytics, the plurality of analytic modules including one or more pre-processing modules, one or more statistical modules and one or more post-processing modules;

receive an input from a user, the input including a user selection of one or more of the plurality of analytic modules to perform desired analytics on the large quantity of data from the external mass storage device;

responsive to the receiving the input including the user selection, automatically generate a master script designating the one or more of the plurality of analytic modules that are to be present in a module chain and an order of performing the one or more designated analytic modules in the module chain, one or more pre-processing modules of the designated one or more of the plurality of analytic modules to be executed before one or more statistical analytic modules of the one or more of the plurality of analytic modules, and the one or more statistical analytic modules of the one or more of the plurality of analytic modules to be executed before one or more post-processing modules of the one or more of the plurality of analytic modules;

execute pre-processing scripts associated with the one or more pre-processing modules of the one or more of the plurality of analytic modules in the module chain to produce one or more partial solutions, the one or more pre-processing modules of the one or more of the plurality of analytic modules preparing and cleaning raw data to produce the one or more partial solutions to be provided to the one or more statistical analytic modules in the module chain;

accept one of the one or more partial solutions and automatically break down scripts associated with the one or more statistical modules of the one or more of the plurality of analytic modules in the module chain into map/reduce jobs and optimize execution of the map/reduce jobs;

execute the map/reduce jobs; and automatically execute alternative statistical modules, based on scoring results of the one or more post-processing modules of the one or more of the plurality of analytic modules, the automatically executing reusing, as input, one of the one or more partial solutions produced by completing execution of at least one of the one or more pre-processing modules to avoid re-execution of the at least one of the one or more pre-processing modules.

7. The computer program product of claim 6, wherein the computer readable program code is further configured to:
validate the one or more partial solutions.

8. The computer program product of claim 6, wherein the atomic operations include map and reduce operations.

9. The computer program product of claim 6, wherein the analytic modules include pre-processing steps, statistical analytic steps, and post-processing steps.

* * * * *